United States Patent
Hashimoto et al.

(10) Patent No.: US 7,360,509 B2
(45) Date of Patent: Apr. 22, 2008

(54) METHOD FOR OPERATING COMPRESSION IGNITION INTERNAL COMBUSTION ENGINE

(75) Inventors: Kohtaro Hashimoto, Wako (JP); Takahiro Gunji, Wako (JP); Kohjiroh Aimoto, Wako (JP); Fumiaki Ikegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 240 days.

(21) Appl. No.: 11/350,110

(22) Filed: Feb. 9, 2006

(65) Prior Publication Data

US 2006/0185644 A1   Aug. 24, 2006

(30) Foreign Application Priority Data

Feb. 22, 2005  (JP)  .............................. 2005-045069

(51) Int. Cl.
*F02B 17/00* (2006.01)
*F02B 43/00* (2006.01)
*F02D 19/10* (2006.01)

(52) U.S. Cl. .................... 123/27 R; 123/295; 123/1 A; 44/436

(58) Field of Classification Search ................ 123/1 A, 123/27 R, 295; 44/328, 436, 413
See application file for complete search history.

(56) References Cited

U.S. PATENT DOCUMENTS 6,835,218 B1 * 12/2004 Drozd et al. .................. 44/459
6,843,208 B2 * 1/2005 Tamura et al. ............. 123/27 R
6,866,010 B2 * 3/2005 May ............................ 123/1 A
7,165,512 B2 * 1/2007 Hashimoto et al. ............ 123/3
7,261,065 B2 * 8/2007 Aimoto et al. .................. 123/3

FOREIGN PATENT DOCUMENTS

JP   2004-076736 A   3/2004
JP   2004-091657 A   3/2004

* cited by examiner

*Primary Examiner*—Stephen K. Cronin
*Assistant Examiner*—Hyder Ali
(74) *Attorney, Agent, or Firm*—Arent Fox LLP

(57) ABSTRACT

An object is to provide a method for operating a compression ignition internal combustion engine which, using a single fuel, can produce diesel combustion when the load is high, or homogeneous-charged compression ignition combustion when the load is low. The operating method includes: employing a fuel containing 95 to 99.5 wt. % of a base fuel made of one or more compounds selected from the group consisting of a hydrocarbon, an alcohol, an ether and a fatty ester, and 0.1 to 5 wt. % of an additive made of one or more compounds selected from the group consisting of an organic peroxide, a nitric ester, a nitrite ester and an azo compound; and producing diesel combustion when the load is high, or homogeneous-charged compression ignition combustion when the load is low. The organic peroxide is di-tert-butyl peroxide. The nitric ester is n-pentyl nitrate. The nitrite ester is n-pentyl nitrite. The azo compound is 2,2-azobis(2,4-dimethylvaleronitrile).

5 Claims, No Drawings

METHOD FOR OPERATING COMPRESSION IGNITION INTERNAL COMBUSTION ENGINE

BACKGROUND OF THE INVENTION

1. Field of the Invention

The present invention relates to a method for operating a compression ignition internal combustion engine.

2. Description of the Related Art

In recent years, in order to reduce a predetermined load, fuel consumption per predetermined time and a quantity of emission matter, in the internal combustion engine, a compression ignition internal combustion engine represented by a homogeneous-charged compression ignition internal combustion engine has been studied. The above described compression ignition internal combustion engine introduces an oxygen-containing gas and a compression self-ignitable fuel into a cylinder, compresses them, and then self-ignites the fuel.

However, it is difficult for the above described homogeneous-charged compression ignition internal combustion engine to produce homogeneous-charged compression ignition combustion in all of the load regions, and it is studied to use diesel combustion when a demand load of the engine is high. Here, the above described homogeneous-charged compression ignition internal combustion engine is a system of "finishing the injection of fuel before the piston reaches a compression top dead center and while a crank angle is larger than 60 degrees", and the above described diesel internal combustion engine is a system of "spraying fuel while the piston is located approximately between 30 degrees by a crank angle before reaching the compression top dead center and about 10 degrees by the crank angle after having passed the compression top dead center" (see Japanese Patent Laid-Open No. 2004-91657).

In addition, the above described homogeneous-charged compression ignition combustion is a combustion system peculiar to the above described homogeneous-charged compression ignition internal combustion engine, and the above described diesel combustion is the combustion system peculiar to the above described diesel internal combustion engine. Generally, it is preferable in the above described homogeneous-charged compression ignition combustion to use a fuel with a low ignitability (long ignition-delayed period), and in the above described diesel combustion to use a fuel with high ignitability (short ignition-delayed period).

In the next place, reference fuels with an octane number of 50 to 90 were prepared by mixing iso-octane and n-heptane, and on each reference fuel, ignition-delayed periods of time in the diesel combustion and in homogeneous-charged compression ignition combustion were measured. The results are shown in Table 1.

Here, the ignition-delayed period in the above described diesel combustion is a value obtained by measuring a period necessary for a pressure in a vessel to increase by 0.02 MPa, after the fuel has been injected into air heated to 500° C. in the vessel that had been pressurized to 2.0 MPa. On the other hand, the ignition-delayed period in the above described homogeneous-charged compression ignition combustion is a value obtained by measuring a period necessary for a pressure in a combination chamber to increase from an initial pressure (0.1 MPa) to 3.0 MPa, when the fuel premixed at an equivalence ratio (φ) of 0.2 was injected into the combustion chamber having the bore of 80 mm, the stroke of 80 mm and the volume of 402.2 ml, and was compressed at the compression ratio of 13.9 in a condition for the piston to require 53 milliseconds after the pressure has increased by 0.03 MPa from the initial pressure (0.1 MPa), and before the compression is finished.

TABLE 1

| | Fuel composition (vol. %) | | Ignition-delayed time (ms) | |
|---|---|---|---|---|
| | iso-octane | n-heptane | Diesel combustion | HCCI combustion |
| Octane number 90 | 90 | 10 | 12.21 | 123.2 |
| Octane number 80 | 80 | 20 | 10.59 | 75.0 |
| Octane number 70 | 70 | 30 | 9.35 | 66.4 |
| Octane number 60 | 60 | 40 | 8.33 | 60.2 |
| Octane number 50 | 50 | 50 | 7.57 | 57.2 |
| Octane number 40 | 40 | 60 | 5.67 | 53.2 |
| Octane number 0 | 0 | 100 | 5.67 | 50.6 |

HCCI combustion: homogeneous-charged compression ignition combustion

It is understood from Table 1 that the reference fuel with an octane number of 80 to 90 has a too long ignition-delayed period for the diesel combustion, but has a suitable ignition-delayed period for the homogeneous-charged compression ignition combustion. In contrast, it is understood that the reference fuel with an octane number of 50 to 70 has a suitable ignition-delayed period for the diesel combustion, but has a too short ignition-delayed period for the homogeneous-charged compression ignition combustion.

Accordingly, in order to produce the above described homogeneous-charged compression ignition combustion when the demand load of the engine is low, in the above described homogeneous-charged compression ignition internal combustion engine, and to produce the above described diesel combustion when the demand load of the engine is high, it is obviously necessary to provide two fuels with an octane number of 80 to 90 for the above described homogeneous-charged compression ignition combustion and an octane number of 50 to 70 for the above described diesel combustion, respectively, and to select one of them for appropriate use.

Conventionally, it has been known that two fuels are provided and selected depending on the demand load of the engine, in the above described homogeneous-charged compression ignition internal combustion engine (see Japanese Patent Laid-Open No. 2004-76736).

However, in order to provide the two fuels and appropriately use them, there is inconvenience of needing to provide a plurality of tanks for separately accommodating each fuel therein.

SUMMARY OF THE INVENTION

An object of the present invention is to provide a method for operating a compression ignition internal combustion engine which, using a single fuel, can produce diesel combustion when the load is high or homogeneous-charged compression ignition combustion when the load is low, and thus eliminate the above inconvenience.

It has been known that the ignitability of the fuel for the diesel combustion internal combustion engine can be improved by containing an additive such as an organic peroxide, a nitric ester, a nitrite ester and an azo compound. As a result of study on the above described additives, the present inventors have found that the above described additives shorten an ignition-delayed period in the above described diesel combustion to show an effect of improving the ignitability, but shows a poor effect of shortening the ignition-delayed period in the above described homogeneous-charged compression ignition combustion, and thus the present invention has been achieved.

In order to achieve the above described object, the method for operating a compression ignition internal combustion engine according to the present invention includes: employing a fuel containing 95 to 99.5 wt. % of a base fuel made of one or more compounds selected from the group consisting of a hydrocarbon, an alcohol, an ether and a fatty ester, and 0.1 to 5 wt. % of an additive made of one or more compounds selected from the group consisting of an organic peroxide, a nitric ester, a nitrite ester and an azo compound; and producing diesel combustion when a load is high, or homogeneous-charged compression ignition combustion when the load is low.

The above described fuel used in the operating method according to the present invention contains the above described additive added to the above described base fuel, and as a result, has the ignition-delayed period shortened for the diesel combustion of the base fuel to improve ignitability, but has the ignition-delayed period hardly shortened for the homogeneous-charged compression ignition combustion. Accordingly, by using the above described fuel, the operating method according to the present invention can produce the diesel combustion when the load is high, and the homogeneous-charged compression ignition combustion when the load is low, with the single fuel.

The above described fuel does not provide the effect of shortening the ignition-delayed period and improving the ignitability in the diesel combustion, when containing the above described base fuel in an amount exceeding 99.5 wt. % and containing the above described additive in an amount less than 0.1 wt. %. On the other hand, the above described fuel does not provide the effect of further shortening the ignition-delayed period and improving the ignitability in the diesel combustion, even when containing the above described base fuel in an amount less than 95 wt. % and the above described additive in an amount exceeding 5 wt. %, so that the composition is economically disadvantageous because of containing excess amount of expensive additive.

The above described additive can include, for instance, di-tert-butyl peroxide for the above described organic peroxide, n-pentyl nitrate for the above described nitric ester, n-pentyl nitrite for the above described nitrite ester and 2,2-azobis(2,4-dimethylvaleronitrile) for the above described azo compound.

DETAILED DESCRIPTION OF THE PREFERRED EMBODIMENTS

In the next place, embodiments of the present invention will be described further in detail.

An operating method according to the present embodiment includes: employing a fuel containing 95 to 99.5 wt. % of a base fuel made of one or more compounds selected from the group consisting of a hydrocarbon, an alcohol, an ether and a fatty ester, and 0.1 to 5 wt. % of an additive made of one or more compounds selected from the group consisting of an organic peroxide, a nitric ester, a nitrite ester and an azo compound; and producing diesel combustion when a load is high, or homogeneous-charged compression ignition combustion when the load is low.

The above described base fuel can employ, for instance, a reference fuel with an octane number of 90 consisting of 90 vol. % iso-octane and 10 vol. % n-heptane.

The above described additive to be used includes one or more compounds selected from the group consisting of an organic peroxide, a nitric ester, a nitrite ester and an azo compound, which are generally used as an agent for improving the cetane number of fuel for a diesel combustion internal combustion engine. The above described organic peroxide includes, for instance, di-tert-butyl peroxide; the above described nitric ester includes, for instance, n-pentyl nitrate; the above described nitrite ester includes, for instance, n-pentyl nitrite; and the above described azo compound includes, for instance, 2,2-azobis (2,4-dimethylvaleronitrile).

In the next place, examples according to the present invention and comparative examples will be described.

EXAMPLE 1

In the present example, a fuel was prepared by employing a reference fuel with an octane number of 90 consisting of 90 vol. % iso-octane and 10 vol. % n-heptane, as a base fuel, and mixing the base fuel in an amount of 99 wt. % with di-tert-butyl peroxide in an amount of 1 wt. % as an additive.

Subsequently, an ignition-delayed period in diesel combustion and an ignition-delayed period in homogeneous-charged compression ignition combustion were measured on the fuel prepared in the present example.

The ignition-delayed period in the above described diesel combustion was obtained by measuring a period necessary for a pressure in a vessel to increase by 0.02 MPa, after the fuel was injected into air heated to 500° C. in the vessel that was pressurized to 2.0 MPa. In addition, the ignition-delayed period in the above described homogeneous-charged compression ignition combustion was obtained by measuring a period necessary for a pressure in a combustion chamber to increase to 3.0 MPa from an initial pressure (0.1 MPa), when the fuel premixed at an equivalence ratio ($\phi$) of 0.2 was injected into the combustion chamber having the bore of 80 mm, the stroke of 80 mm and the volume of 402.2 ml, and was compressed at the compression ratio of 13.9 in a condition for the piston to require 53 milliseconds after the pressure increased by 0.03 MPa from the initial pressure (0.1 MPa), and before the compression was finished.

The results are shown in Table 2.

EXAMPLE 2

In the present example, an ignition-delayed period in diesel combustion and an ignition-delayed period in homogeneous-charged compression ignition combustion were measured on the fuel in the exact same way as in Example 1, except that the fuel was prepared by mixing 97 wt. % of the above described base fuel with 3 wt. % of di-tert-butyl peroxide as an additive. The results are shown in Table 2.

EXAMPLE 3

In the present example, an ignition-delayed period in diesel combustion and an ignition-delayed period in homogeneous-charged compression ignition combustion were measured on the fuel in the exact same way as in Example 1, except that the fuel was prepared by mixing 95 wt. % of the above described base fuel with 5 wt. % of di-tert-butyl peroxide as an additive. The results are shown in Table 2.

EXAMPLE 4

In the present example, an ignition-delayed period in diesel combustion and an ignition-delayed period in homogeneous-charged compression ignition combustion were measured on the fuel in the exact same way as in Example 1, except that the fuel was prepared by mixing 99 wt. % of the above described base fuel with 1 wt. % of n-pentyl nitrate as an additive. The results are shown in Table 2.

EXAMPLE 5

In the present example, an ignition-delayed period in diesel combustion and an ignition-delayed period in homogeneous-charged compression ignition combustion were measured on the fuel in the exact same way as in Example 1, except that the fuel was prepared by mixing 98 wt. % of the above described base fuel with 2 wt. % of n-pentyl nitrate of as additive. The results are shown in Table 2.

EXAMPLE 6

In the present example, an ignition-delayed period in diesel combustion and an ignition-delayed period in homogeneous-charged compression ignition combustion were measured on the fuel in the exact same way as in Example 1, except that the fuel was prepared by mixing 99 wt. % of the above described base fuel with 1 wt. % of n-pentyl nitrite as an additive. The results are shown in Table 2.

EXAMPLE 7

In the present example, an ignition-delayed period in diesel combustion and an ignition-delayed period in homogeneous-charged compression ignition combustion were measured on the fuel in the exact same way as in Example 1, except that the fuel was prepared by mixing 98 wt. % of the above described base fuel with 2 wt. % of n-pentyl nitrite as an additive. The results are shown in Table 2.

EXAMPLE 8

In the present example, an ignition-delayed period in diesel combustion and an ignition-delayed period in homogeneous-charged compression ignition combustion were measured on the fuel in the exact same way as in Example 1, except that the fuel was prepared by employing a reference fuel with an octane number of 50 consisting of 50 vol. % iso-octane and 50 vol. % n-heptane, as a base fuel, and mixing 99 wt. % of the above described base fuel with 1 wt. % of di-tert-butyl peroxide as an additive. The results are shown in Table 2.

COMPARATIVE EXAMPLE

In the present comparative example, an ignition-delayed period in diesel combustion and an ignition-delayed period in homogeneous-charged compression ignition combustion were measured on the fuel in the exact same way as in Example 1, except that the fuel was prepared by mixing 50 wt. % of the above described base fuel with 50 wt. % of hexane. The results are shown in Table 2.

TABLE 2

| | Fuel composition (wt. %) | | Ignition-delayed time (ms) | |
|---|---|---|---|---|
| | Reference fuel | Additive | Diesel combustion | HCCI combustion |
| Example 1 | 99 | 1*1 | 8.80 | 89.8 |
| Example 2 | 97 | 3*1 | 8.09 | 89.6 |
| Example 3 | 95 | 5*1 | 7.54 | 83.0 |
| Example 4 | 99 | 1*2 | 9.12 | 85.8 |
| Example 5 | 98 | 2*2 | 8.41 | 78.2 |
| Example 6 | 99 | 1*3 | 9.24 | 78.2 |
| Example 7 | 98 | 2*3 | 8.37 | 76.2 |
| Example 8 | 99 | 1*1 | 5.18 | 54.2 |
| Comparative Example 1 | 50 | 50*4 | 8.80 | 62.0 |

HCCI combustion: homogeneous-charged compression ignition combustion
Reference fuel:
Examples 1 to 7 . . . reference fuel with octane number of 90 consisting of 90 vol. % iso-octane and 10 vol. % n-heptane
Example 8 . . . reference fuel with octane number of 50 consisting of 50 vol. % iso-octane and 50 vol. % n-heptane
Additive:
*1 di-tert-butyl peroxide
*2 n-pentyl nitrate
*3 n-pentyl nitrite
*4 hexane It is obvious from Table 2 that fuels in Examples 1 to 7 according to the present invention have ignition-delayed periods of 7.54 to 9.24 milliseconds in diesel combustion, which correspond to those of the fuels with octane numbers of 50 to 70 shown in Table 1. In addition, fuels in Examples 1 to 7 according to the present invention have ignition-delayed periods of 76.2 to 89.8 milliseconds in homogeneous-charged compression ignition combustion, which are not greatly decreased values compared to the ignition-delayed period of 123.2 milliseconds (see Table 1) for the reference fuel with an octane number of 90 in the homogeneous-charged compression ignition combustion, and correspond to those of the fuels with octane numbers of 80 to 90 shown in Table 1.

In addition, a fuel in Example 8 according to the present invention has the ignition-delayed period of 5.18 milliseconds in diesel combustion, which is shorter than the ignition-delayed period of 5.67 milliseconds (see Table 1) in a fuel (n-heptane) with an octane number of 0 in the diesel combustion, but obviously has the ignition-delayed period of 54.2 milliseconds in homogeneous-charged compression ignition combustion, which is longer than the ignition-delayed period of 53.2 milliseconds (see Table 1) in the reference fuel with an octane number of 40 in the homogeneous-charged compression ignition combustion.

Accordingly, the above described fuel according to the present invention has ignitability suitable for both of diesel combustion and homogeneous-charged compression ignition combustion, and the operation using the fuel obviously can produce diesel combustion when the load is high, or homogeneous-charged compression ignition combustion when the load is low, with the single fuel.

In contrast to the above described Examples 1 to 7, the fuel of Comparative Example 1 having hexane added to the above described reference fuel with an octane number of 90 has suitable ignitability for diesel combustion, but has too short an ignition-delayed period in homogeneous-charged compression ignition combustion, thus obviously having no suitable ignitability for the homogeneous-charged compression ignition combustion.

The above described Examples 1 to 7 use any of di-tert-butyl peroxide as an organic oxide, n-pentyl nitrate as a nitric ester, and n-pentyl nitrite as a nitrite ester for the additive, but can provide a similar effect as well when using an azo compound such as 2,2-azobis (2,4-dimethylvaleronitrile) for the additive.

What is claimed is:

1. A method for operating a compression ignition internal combustion engine, comprising:

employing a fuel containing 95 to 99.5 wt. % of a base fuel made of one or more compounds selected from the group consisting of a hydrocarbon, an alcohol, an ether and a fatty ester, and 0.1 to 5 wt. % of an additive made of one or more compounds selected from the group consisting of an organic peroxide, a nitric ester, a nitrite ester and an azo compound; and producing either diesel combustion when a load is high, or homogeneous-charged compression ignition combustion when the load is low.

2. The method for operating a compression ignition internal combustion engine according to claim 1, wherein the organic peroxide is di-tert-butyl peroxide.

3. The method for operating a compression ignition internal combustion engine according to claim 1, wherein the nitric ester is n-pentyl nitrate.

4. The method for operating a compression ignition internal combustion engine according to claim 1, wherein the nitrite ester is n-pentyl nitrite.

5. The method for operating a compression ignition internal combustion engine according to claim 1, wherein the azo compound is 2,2-azobis (2,4-dimethylvaleronitrile).

* * * * *